United States Patent [19]
Helger

[11] 3,798,000
[45] Mar. 19, 1974

[54] AGENT AND METHOD FOR DETERMINATION OF CALCIUM

[75] Inventor: Roland Helger, Darmstadt, Germany

[73] Assignee: Merck Patent Gesellschaft mit beschrankter Haftung, Darmstadt, Germany

[22] Filed: Aug. 14, 1972

[21] Appl. No.: 280,174

[30] Foreign Application Priority Data
Sept. 3, 1971   Germany............................ 2144136

[52] U.S. Cl............... 23/230 R, 23/230 B, 23/231, 252/408
[51] Int. Cl.... C09k 3/00, G01n 31/00, G01n 33/00
[58] Field of Search.............. 23/230 B, 231, 230 R; 252/408

[56] References Cited
UNITED STATES PATENTS

| | | | |
|---|---|---|---|
| 2,824,842 | 2/1958 | Sulkowitch | 252/408 |
| 2,910,349 | 10/1959 | Reeder et al. | 23/250 R |
| 3,121,613 | 2/1964 | Bittner | 23/230 R |
| 3,457,045 | 7/1969 | Fraguada et al. | 23/230 B |

FOREIGN PATENTS OR APPLICATIONS

| | | | |
|---|---|---|---|
| 410,941 | 6/1945 | Italy | 23/230 R |
| 274,488 | 5/1969 | U.S.S.R. | 23/231 |

OTHER PUBLICATIONS

Lapious and Mellon, Determination of Calcium in Meat and Bone Meal, May, 1958, Journal of the Association of Official Agricultural Chemists, pages 411-414.

D. N. Baron and J. L. Bell, A Simple Specific Titration Method for Serum Calcium, Clinica Chimica Act., Vol. 2, 1957.

*Primary Examiner*—Joseph Scovronek
*Assistant Examiner*—Michael Marcus
*Attorney, Agent, or Firm*—Millen, Raptes & White

[57] ABSTRACT

An agent for the colorimetric determination of calcium, containing a color reagent, which forms complexes in the presence of calcium ions, and a buffer system which consists essentially of a mixture of amidosulfonic acid, disodium tetraborate and alkali carbonate.

7 Claims, No Drawings

AGENT AND METHOD FOR DETERMINATION OF CALCIUM

BACKGROUND OF THE INVENTION

This invention relates to an agent and a method for the colorimetric determination of calcium.

The exact determination of the calcium content of fluids, e.g., biological fluids, such as blood serum, blood plasma, urine, cerebrospinal fluids, etc., is of importance for diagnostic purposes. The calcium level is normally at a relatively constant level in most body fluids. Changes in the calcium concentration in blood serum can indicate several pathological conditions. For example, hypercalcemia occurs in hyperfunction of the parathyroid glands and the thyroid glands, in sarcoidosis, and in several metastasizing carcinomas. Hypercalcemia is also connected, inter alia, with osteoporosis and osteoplastic carinomas, with acute pancreatitis, and acidoses.

A number of chemical and physical procedures are known for the determination of calcium in biological fluids. For the clinical laboratory and the general practitioner, procedures are desired which combine a sufficient sensitivity and specificity with simplicity in conducting the procedures. Direct colorimetric procedures are particularly desirable, whereby procedural steps of protein precipitation and calcium precipitation as well as a subsequent gravimetric or titrimetric determination can be dispensed with. Dyes forming colored complexes with calcium ions are known from the literature, for example, eriochrome blue SE, glyoxalbis(2-hydroxyanil), alizarin, nuclear fast red and murexide.

A published method for calcium determination in blood serum involves the use of phthalein purple with an ammonia/ammonium chloride buffer at a pH of 10.5 (B. C. Ray Sarkar and U. P. S. Chauhan, Anal. Biochem. 20, 155 [1967]).

Known conventional methods for calcium determination exhibit considerable disadvantages, and the objective of accomplishing a relatively simple procedure has not as yet been attained. For example, according to the above mentioned procedure of Sarkar and Chauhan, a solution suitable for photometric measurement requires 6 pipetting steps. The $NH_3/NH_4Cl$ buffer is not an optimum selection, since in the lower region, it produces a curved calibration curve. Furthermore, it is unpleasant to work with an ammonia-containing buffer, and, in particular, the buffer is poorly suited for producing a set of reagents. Nonlinear calibration curves and a nonuniform course of the reaction in both the serum and the aqueous standard solution, lead to erroneous results.

In accordance with this invention, the above-described disadvantages can be extensively avoided by conducting the colorimetric calcium determination using an agent comprising a novel buffer system.

SUMMARY OF THE INVENTION

This invention relates to an agent for the colorimetric determination of calcium ions in fluids, particularly in biological fluids. The agent contains a color reagent which forms complexes in the presence of calcium ions and a buffer system. The agent is characterized by a novel buffer system consisting essentially of a mixture of amidosulfonic acid, disodium tetraborate, and an alkali carbonate.

Furthermore, the present invention relates to a method for the determination of calcium ions in fluids, particularly in biological fluids, which comprises measuring the light absorption of the complex which is formed from a calcium-containing sample in a novel buffer system containing a color reagent which complexes calcium ions. The method is characterized by the buffer system, which consists essentially of a mixture of amidosulfonic acid, disodium tetraborate, and an alkali carbonate.

DETAILED DISCUSSION

Generally, the procedure of the invention comprises the use of the agent to color complex the calcium content of a test specimen. This is accomplished by reacting the test specimen in a solution of the agent. After an appointed time, the light absorption is measured in a colorimeter against a blank sample containing the agent and water in place of the test specimen. The calculation is carried out by way of the standard solution treated in an analogous manner with the following equation:

$(\Delta A_A/\Delta A_S)$ · concentration of standard = concentration of calcium $\Delta A_A$ = Absorbtion of test specimen against blank sample $\Delta A_S$ = Absorbtion of standard solution against blank sample The color reagents for suitably complexing the calcium, according to this invention are, for example, phthalein purple, eriochrome blue SE, alizarin, and other conventional color complexing reagents. Phthalein purple is particularly advantageous. Furthermore, it was found that 8-hydroxyquinoline sulfate can be added to the reagent to suitably mask the magnesium ions, which interfere in the determination of the calcium.

The buffer mixture of amidosulfonic acid, disodium tetraborate, alkali carbonate, is easy to handle, has a long shelf life, and makes it possible to effect the determination of calcium with the color complex-forming reagents, such as phthalein purple, from aqueous solutions as well as also from biological fluids in a reproducible manner. The calibration curve is linear, and no deproteinization is necessary.

Suitable alkali carbonates are sodium and potassium carbonate, and in particular, sodium carbonate.

Preferably, an amidosulfonic acid-borax-sodium carbonate buffer of a pH of 9.9 is employed containing, per liter: 4 – 5 g. amidosulfonic acid, 0.5–0.8 g. disodium tetraborate · 10 $H_2O$ (borax), and 8–12 g. sodium carbonate. The pH can be varied between 8.5 and 12 by correspondingly varying the amount of sodium carbonate. Preferably, the pH is within a range between 8.9 and 10.0.

The molarity of the buffer can be varied by simultaneously reducing or increasing the amounts of all three buffer components by 0.5 to 2.0 times. With rising molarity, the pH value and the blank value increase.

In a preferred embodiment, the agent consists of a solution of color complexing reagents, particularly phthalein purple, and the 8-hydroxyquinoline sulfate in the aforementioned buffer. A satisfactory sensitivity in the normal range (9–11 mg. of calcium ion per 100 ml.) is attained, for example, at a phthalein purple concentration of 20–80 mg./1000 ml., preferably 60 mg./1000 ml. At higher dye concentrations, the ratio of blank value to analysis value becomes increasingly less favorable. At a hydroxyquinoline sulfate quantity of 500–3000 mg., particularly 1,000–1,200 mg., per 1,000 ml., the masking of magnesium is at an optimum. In place of 8-hydroxyquinoline sulfate, it is also possible to use the equivalent quantity of 8-hydroxyquinoline.

Color complex-forming reagents, such as phthalein purple with 8-hydroxyquinoline sulfate are very readily dissolved in the above described buffer system. A colorimetric determination can be conducted in a particularly simple manner by compressing into tablets, in predosed amounts, the color reagent together with the amidosulfonic acid, preferably with an inert substance, e.g. lactose, amylose, talc, polywaxes, etc. The tablets are dissolved in a specific volume of buffer solution containing the necessary amounts of the other buffer components, i.e. the borate and the alkali carbonate, preferably sodium carbonate. After dissolution, the test sample containing calcium can be added by pipetting, and the light absorption of the reaction solution can be measured. In this procedure, only two pipetting operations per determination are required.

Compared to the above mentioned complicated methods for calcium determination, the method of this invention involves a simplified procedure permitting the carrying out of a large series of analyses within a short period of time. The novel method is distinguished by yielding exact and reproducible results. The sources of error are extensively eliminated, particularly in view of the fact that only two pipetting steps are required.

In the procedure of this invention, a sample to be tested with respect to its calcium content is combined and mixed with the buffered color reagent solution. After 5–45 minutes, preferably after 20–30 minutes, the light absorption is measured in a colorimeter at 560–580 nm. (nanometers) against a blank sample containing water instead of the test specimen.

The thus-measured difference in light absorption between the test sample and the blank sample is proportional to the amount of calcium ion contained in the test sample. The measuring temperature is not critical. It is recommended, however, that the determination be conducted at about 10°–40°C., preferably at 20°–25°C.

Preferably, the agent of this invention, for calcium ion determination using the above-described method, is utilized in the form of a test kit. The test kit can contain a ready-for-use buffer solution or a concentrate thereof, an aqueous standard solution, and tablets comprising predosed amounts of phthalein purple, amidosulfonic acid, and 8-hydroxyquinoline sulfate, along with inert substances not participating in the complexing reaction, such as, for example lactose, amylose, talc, polywaxes, etc.

The calcium determination, according to the present invention, can also be conducted with automatic analyzers. For this purpose, the calcium-containing test samples are fed, via a sample collector, to an analyzing system wherein the agent comprising the color reagent and buffer system are added to the individual test samples. After mixing and termination of the complexing formation, the reaction solution is fed to a colorimeter and measured.

In addition to being used for calcium determination in calcium containing liquids, e.g., biological fluids, such as blood serum, blood plasma, urine, cerebrospinal fluids, etc., the agent and method of this invention are similarly useful in various industries, particularly the foodstuff industry. Calcium determinations are of interest, for example, in the analysis of baking powder, bread, flour, face powder, fruit, cereal grains, mineral water, table salt, spices, vitamins, etc.

The invention will be explained in greater detail with the aid of the following examples.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

An agent for the colorimetric determination of calcium ions in a biological fluid contains the following color reagent per liter of buffer solution:
60 mg. phthalein purple and
1120 mg. 8-hydroxyquinoline sulfate.
The buffer solution contains, per liter of water:
4.4 g. amidosulfonic acid,
0.65 g. disodium tetraborate · 10 $H_2O$, and
10.44 g. sodium carbonate (or 13.8 g. potassium carbonate).

A 0.1 ml. test specimen of serum, plasma, or urine is combined with 5 ml. of the agent solution, mixed together, and after 20 minutes, the light absorption is measured in a colorimeter at 560–580 nm. ($d = 1$ cm.) against a blank sample containing the agent and water in place of the test specimen. A microanalysis can be effected with one-fifth to one-tenth of the above-mentioned quantities. The calculation is carried out by way of the standard solution treated in an analogous manner. In case the calcium content is more than 15 mg./100 ml., the sample is suitably diluted, for example, one to one, with a physiological NaCl solution, and the result is multiplied by 2.

Alternatively, the color complexing reagents, alizarin and eriochrome blue SE, were utilized in place of phthalein purple. With the use of alizarin, the measurement was conducted at 490–610 nm., particularly at 530 nm., while the measuring range with the use of eriochrome blue SE ranged between 570 and 650 nm., especially 600 nm.

EXAMPLE 2

Two g. of a spice are incinerated in a platinum dish at 550°C. in a muffle furnace. After about 2 hours, the residue is digested with a hot 10 percent hydrochloric acid solution, evaporated to dryness, moistened with a dilute hydrochloric acid solution, and again evaporated to dryness. The residue is mixed with 5 ml. of 10 percent hydrochloric acid solution and 50 ml. of water, and heated for several minutes in a boiling water bath. Thereafter, the reaction mixture is filtered and the insoluble residue washed with water. The combined filtrates and washing solutions were adjusted to a pH of 10.0 by means of dilute sodium hydroxide solution. In an aliquot part of this solution, the calcium content is determined analogously to Example 1 in a colorimeter and calculated from a standard solution.

EXAMPLE 3

One ml. of milk is diluted with 9 ml. of distilled water. In 0.1 ml. of this solution, the calcium content is determined analogously as in Example 1 in a colorimeter and the result multiplied by 10.

EXAMPLE 4

0.1 g. of spinach leaves are washed, dried at 100°–105°C., and incinerated at 550°C. for about 2 hours. The residue is dissolved in 0.01 N hydrochloric acid and diluted with distilled water to a volume of 10 ml. Of this solution, 0.1 ml. is analyzed for calcium content analogously as in Example 1 in a colorimeter.

EXAMPLE 5

A test kit for conducting approximately 2 × 10 analyses, 2 × 2 blank values, and 2 × 2 standard solutions, contains the following components:
  150 ml. ready-for-use borate-carbonate solution,
  1 ml. aqueous standard solution (10 mg. $Ca^{2+}$/100 ml.), and
  15 tablets,
each tablet containing the following ingredients:
  0.60 mg. phthalein purple,
  11.20 mg. 8-hydroxyquinoline sulfate,
  43.98 mg. amidosulfonic acid,
  42.22 mg. lactose.

The ready-for-use borate-carbonate solution contains $45.3 \times 10^{-3}$ mol/l. disodium tetraborate · 10 $H_2O$ and 0.1 mol/l. of sodium carbonate.

To produce the color reagent-buffer solution for testing a calcium-containing sample, 10 tablets are dissolved and mixed in 100 ml. of ready-for-use borate-carbonate solution. 0.1 ml of the sample to be tested for its calcium content is combined with 5 ml. of the color reagent-buffer solution, and the calcium content is determined analogously as in Example 1, in a colorimeter.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An agent for the colorimetric determination of calcium ions in solution, comprising a color reagent which forms color complexes in the presence of calcium ions, and a buffer system consisting essentially of amidosulfonic acid, disodium tetraborate, and an alkali carbonate.

2. An agent in accordance with claim 1 wherein said color reagent and amidosulfonic acid are in tablet form and said alkali carbonate and disodium tetraborate are in solution form.

3. An agent in accordance with claim 2, wherein said color reagent comprises phthalein purple and 8-hydroxyquinoline sulfate.

4. An agent in accordance with claim 1 wherein said buffer system comprises in grams per liter of aqueous solution, 4 – 5 g. amidosulfonic acid, 0.5 – 0.8 g. disodium tetraborate, and 8–12 g. sodium carbonate.

5. An agent in accordance with claim 1 wherein said color reagent comprises phthalein purple and 8-hydroxyquinoline sulfate.

6. A method for colorimetric determination of calcium ions in a test solution, comprising mixing said calcium ion-containing test solution with an agent solution comprising a color reagent which forms color complexes in the presence of calcium ions, and a buffer system consisting essentially of amidosulfonic acid, disodium tetraborate, and an alkali carbonate, and thereafter measuring the light absorption of the color complex formed in the solution.

7. A method in accordance with claim 6 wherein said color reagent and said amidosulfonic acid in tablet form are mixed with an aqueous solution of sodium tetraborate and sodium carbonate to form said agent solution.

* * * * *